(12) United States Patent
Schaub et al.

(10) Patent No.: US 6,786,685 B2
(45) Date of Patent: Sep. 7, 2004

(54) POWER TOOL HAVING A QUICK-RELEASE CHUCK ASSEMBLY

(75) Inventors: Bernard Schaub, University Heights, OH (US); David B. Levine, Pepper Pike, OH (US)

(73) Assignee: Toolovation, LLC, Beachwood, OH (US)

( * ) Notice: Subject to any disclaimer, the term of this patent is extended or adjusted under 35 U.S.C. 154(b) by 0 days.

(21) Appl. No.: 10/200,086

(22) Filed: Jul. 19, 2002

(65) Prior Publication Data

US 2004/0013488 A1 Jan. 22, 2004

(51) Int. Cl.[7] ............................................. B23B 45/02
(52) U.S. Cl. ........................ 408/240; 409/182; 279/75
(58) Field of Search .................. 408/239 R, 240; 409/182; 279/22, 30, 75, 80, 82, 902, 905

(56) References Cited

U.S. PATENT DOCUMENTS

| | | | | |
|---|---|---|---|---|
| 2,807,732 A | * | 9/1957 | Kurtovich | ..................... 310/50 |
| 4,078,618 A | | 3/1978 | DePagter et al. | |
| 4,161,242 A | | 7/1979 | Moores, Jr. et al. | |
| 4,184,692 A | | 1/1980 | Benson et al. | |
| 4,273,344 A | | 6/1981 | Benson et al. | |
| 4,491,444 A | | 1/1985 | Rumpp et al. | |
| 4,620,539 A | | 11/1986 | Andrews et al. | |
| 4,669,932 A | * | 6/1987 | Hartley | ................... 408/239 R |
| 4,850,758 A | | 7/1989 | Morgan | |
| 4,858,939 A | | 8/1989 | Riggs | |
| 4,859,125 A | | 8/1989 | Lubiarz | |
| 4,900,202 A | | 2/1990 | Wienhold | |
| 4,915,555 A | * | 4/1990 | Smothers | ..................... 408/240 |
| 5,013,194 A | | 5/1991 | Wienhold | |
| 5,028,181 A | | 7/1991 | Jenkins et al. | |
| 5,398,946 A | | 3/1995 | Quiring | |
| 5,779,404 A | | 7/1998 | Jore | |
| 5,921,730 A | * | 7/1999 | Young et al. | ................ 409/182 |
| 5,997,225 A | * | 12/1999 | Young et al. | ................ 409/182 |
| 6,007,277 A | | 12/1999 | Olson et al. | |
| 6,045,306 A | * | 4/2000 | Buddendeck et al. | ........ 409/182 |
| 6,053,675 A | | 4/2000 | Holland et al. | |
| 6,059,493 A | | 5/2000 | Kirn et al. | |
| 6,074,140 A | | 6/2000 | Cook | |
| 6,079,917 A | * | 6/2000 | Miksa et al. | ................. 409/182 |
| 6,079,918 A | * | 6/2000 | Buddendeck et al. | ........ 409/182 |
| 6,139,228 A | | 10/2000 | Longo | |
| 6,224,305 B1 | * | 5/2001 | Huggins | ...................... 409/182 |
| 6,244,797 B1 | * | 6/2001 | Wheeler | ...................... 409/182 |
| 6,261,035 B1 | | 7/2001 | Moores, Jr. et al. | |
| 6,264,208 B1 | * | 7/2001 | Sakamaki et al. | .......... 279/43.4 |
| 6,382,636 B1 | * | 5/2002 | Walker | ........................ 279/60 |

* cited by examiner

Primary Examiner—Daniel W. Howell
(74) Attorney, Agent, or Firm—Benesch Friedlander Coplan & Aronoff LLP

(57) ABSTRACT

A tool comprising a housing having a handle and a distal end wherein the distal end includes a spindle capable of receiving a bit and defining an axis of rotation. The tool further comprises a quick-release chuck assembly that includes a sleeve and a trigger. The sleeve is disposed about the spindle and spring biased in a locked position wherein the sleeve is capable of being moved axially to an unlocked position to permit insertion of such a bit. The trigger includes a finger receiving portion and an actuator portion where the finger receiving portion extends from the housing in a position that enables the user to actuate the trigger with a finger of the hand holding the handle. The actuator portion is in physical communication with an engagement portion of the sleeve wherein the activation of the trigger causes the sleeve to move axially to the unlocked position.

14 Claims, 12 Drawing Sheets

POWER TOOL HAVING A QUICK-RELEASE CHUCK ASSEMBLY

BACKGROUND OF THE INVENTION

The present invention relates generally to tools and more particularly to a powered drill for drilling holes using drill bits and/or power bits having a hex shaped shank.

Changing drill bits in a drill is a slow, time consuming procedure that essentially requires three hands. One hand is used to activate the tool's release mechanism (typically requiring a movement that requires the use of at least two fingers or a thumb and a finger), one hand is used to remove and insert a drill bit, and a third hand is required to hold and stabilize the drill during the removal/insertion procedure. Because humans only have two hands, the third hand is usually replaced by holding the drill in between the user's knees or between the user's arm and chest. Therefore, this procedure is very time consuming, awkward, and sometimes results in dropping the drill.

Accordingly, the present invention provides for a quick-release chuck assembly that requires only two hands for the removal/insertion of a drill bit where the release trigger is within finger's reach of the drill handle and the release trigger can be activated with a single finger movement. The present invention also provides for a powered drill that incorporates the aforementioned quick-release chuck assembly.

SUMMARY OF THE INVENTION

In one embodiment, the present invention provides for a tool comprising a housing having a handle portion and a distal end portion wherein the distal end portion includes a spindle capable of receiving a bit and defining an axis of rotation. The tool further comprises a quick-release chuck assembly that includes a sleeve and a trigger. The sleeve is disposed about the spindle and spring biased in a locked position wherein the sleeve is capable of being moved axially to an unlocked position to permit insertion of such a bit. The trigger includes a finger receiving portion and an actuator portion where the finger receiving portion extends from the housing in a position that enables the user to actuate the trigger with a finger of the hand holding the handle. The actuator portion is in physical communication with an engagement portion of the sleeve wherein the activation of the trigger causes the sleeve to move axially to the unlocked position.

In another embodiment, the present invention provides for a quick-release chuck assembly for use in a tool having a housing that includes a handle portion and a distal end portion. The distal end portion of the tool includes a spindle capable of receiving a bit and defining an axis of rotation. The quick-release chuck assembly comprises a sleeve and a trigger. The sleeve is disposed about the spindle and spring biased in a locked position wherein the sleeve is capable of being moved axially to an unlocked position to permit insertion of such a bit. The trigger includes a finger receiving portion and an actuator portion where the finger receiving portion extends from the housing in a position that enables the user to actuate the trigger with a finger of the hand holding the handle. The actuator portion is in physical communication with an engagement portion of the sleeve wherein the activation of the trigger causes the sleeve to move axially to the unlocked position.

DETAILED DESCRIPTION OF THE INVENTION

Figure 1:
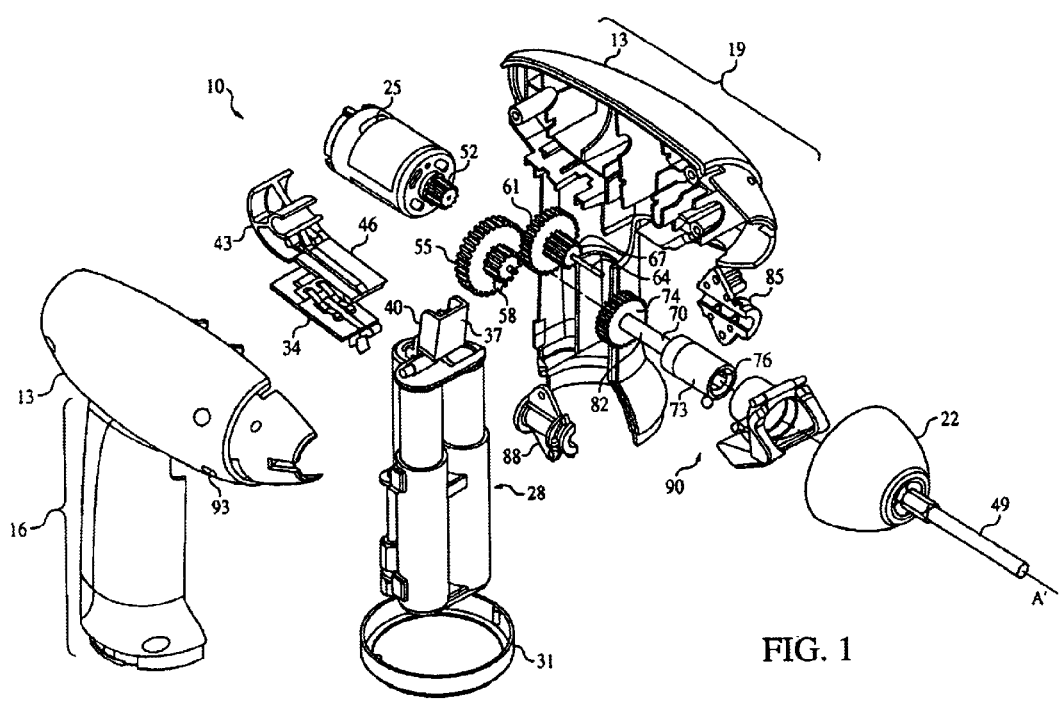
FIG. 1 is an exploded perspective view of powered drill 10 according to the present invention.

Referring now to the drawings wherein the showings are for purposes of illustrating the preferred embodiment of the present invention only and not for purposes of limiting the same, FIG. 1 illustrates a powered drill 10 that comprises a housing having a pair of side members 13 defining a tool handle 16 and a motor and gear housing 19. Nose cap 22 completes the housing of drill 10. A compact reversible direct current (DC) motor 25 is secured within the pair of side members 13. The pair of side members 13 are held together by screws (not shown). A source of electrical energy is provided to motor 25 from battery assembly 28 located in handle 16. Cap 31 is located on the end of handle 16 so that battery assembly 28 can be removed and re-installed when needed. Although it is preferred that the housing components (i.e., pair of side members 13, nose cap 22, and cap 31) be constructed of a lightweight plastic material, it is contemplated that other materials may used such as composites, aluminum, steel, stainless steel, alloys, and combinations thereof.

Figure 2:
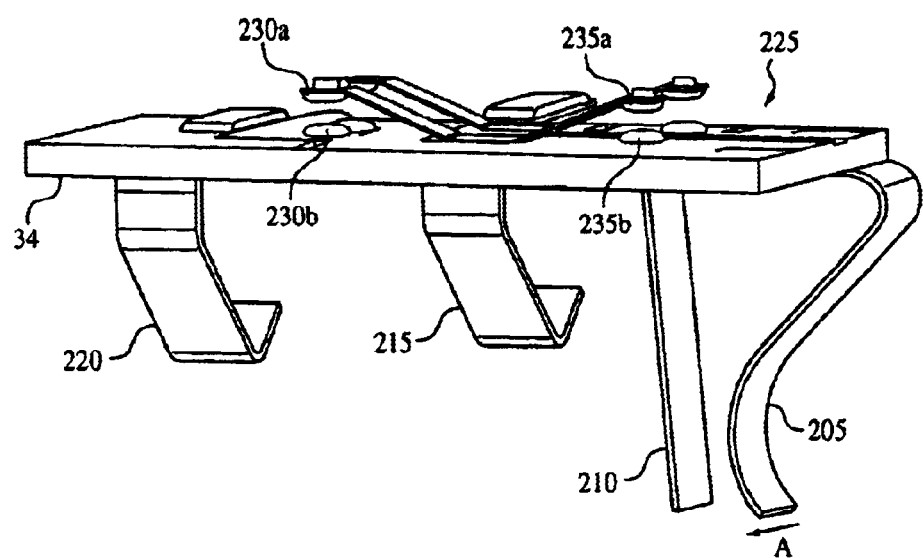
FIG. 2 is an exploded perspective view of PCB assembly 34 according to the present invention.

Battery assembly 28 and motor 25 are electrically interconnected through power/polarity control printed circuit board (PCB) assembly 34 that includes power contacts 205, 210 and polarity contacts 215, 220 as shown in more detail in FIG. 2. Polarity contacts 215, 220 are in contact with battery assembly 28 to reverse the polarity of the electrical voltage to motor 25. The top portion 225 of PCB assembly 34 also includes two pairs of contacts 230a, 230b and 235a, 235b that when brought together result in forward or reverse rotation of drill 10, respectively. To initiate powered operation of drill 10, a manual trigger switch 37 is preferably provided within handle 16 in a position that permits the user to hold handle 16 in the position of the user's hand and actuate trigger switch 37 with the user's index finger. Trigger switch 37 is also provided in handle 16 such that the rear portion 40 of trigger switch 37 is either touching (i.e., in physical communication) or in close proximity to contact 205 where activation of trigger switch 37 causes contact 205 to move towards contact 210. To provide power to drill 10, trigger switch 37 is activated by the user thereby forcing contact 205 to move in a direction indicated by arrow A and touch contact 210 to create an electrical connection. Alternatively, rear portion 40 of trigger switch 37 may be provided with a bent spring (not shown) such that when trigger switch 37 is activated, rear portion 40 of trigger 37 switch forces the bent spring to move rearward towards contact 205, which forces contact 205 to move towards contact 210. Once contact 205 is touching contact 210, an electrical connection is made thereby powering drill 10. In another embodiment, a first portion of the bent spring may be provided between contacts 205 and 210 such that activation of trigger switch 37 forces a second portion of the bent spring into contact with contact 205 which then contacts the first portion of the bent spring. The first position of the bent spring then touches contact 210 thereby making an electrical connection to initiate power to drill 10.

Figure 3A:
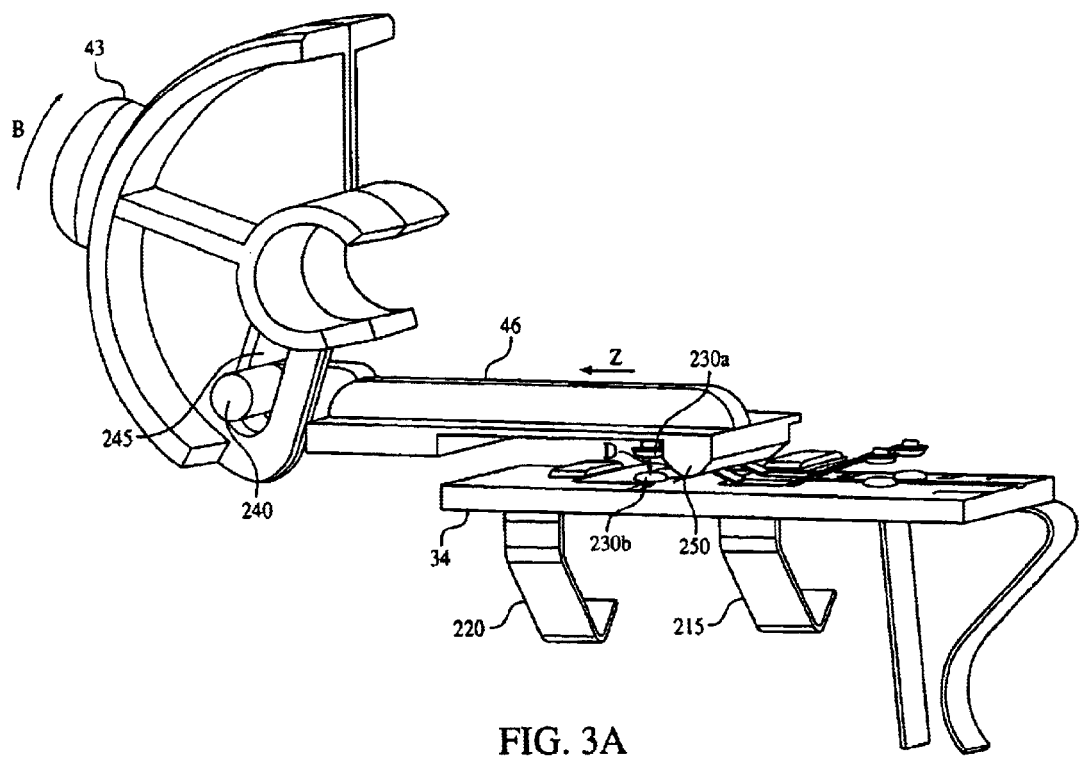
FIG. 3A is a perspective view of forward-reverse switch 43 and PCB assembly 34 shown in the forward rotation position.
Figure 3B:
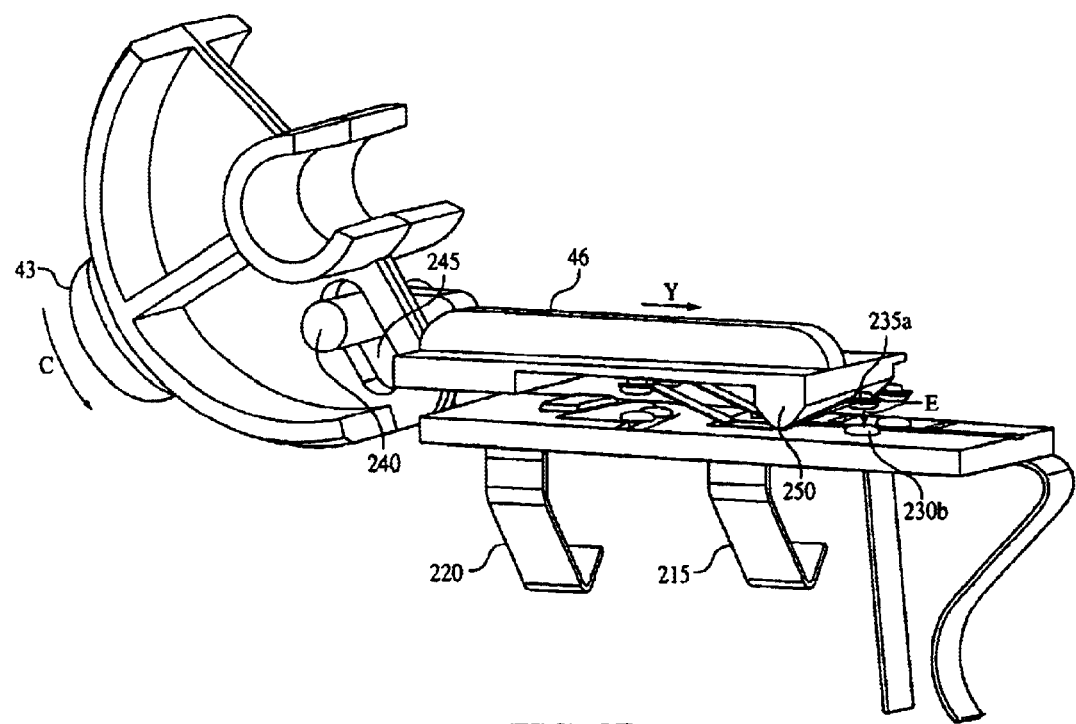
FIG. 3B is a perspective view of forward-reverse switch 43 and PCB assembly 34 shown in the reverse rotation position.

To control the polarity of the output voltage to selectively reverse the operation of motor 25, forward-reverse switch 43 preferably extends from housing 25 in a position that permits the user to hold handle 16 in the position of the user's hand and activate forward-reverse switch 43 with the user's thumb. Forward-reverse switch 43 is movable between a forward rotation position (see FIG. 3A) and a reverse rotation position (see FIG. 3B). Preferably, the actuation of switch 43 by the user in the forward direction as indicated by Arrow B shown in FIG. 3A corresponds to the forward rotation position while the actuation of switch 43 in the rearward direction as indicated by Arrow C shown in FIG. 3B corresponds to the reverse rotation position. Forward-reverse switch 43 is coupled to actuator 46 having pin 240 which is sliding engaged in slot 245 of switch 43. Thus, actuation of switch 43 creates pivotal movement that is translated to actuator 46 thereby causing actuator head 250 to slide along the top portion 225 of PCB assembly 34 and force contacts 230a or 235a to meet 230b or 235b, respectively. In operation, when the user urges switch 43 to the forward rotation position as shown in FIG. 3A, actuator head 250 slides in the direction indicated by arrow Z and forces contacts 230a to touch contacts 230b as indicated by arrow D. Since polarity contact 220 is in electrical communication with contacts 230b, and since polarity contact 220 is in electrical communication with battery assembly 28, then the electrical circuit is complete for forward rotation of drill 10. Alternatively, when the user urges switch 43 to the reverse rotation position as shown in FIG. 3B, actuator head 250 slides in the direction as indicated by arrow Y and forces contacts 235a to touch contacts 235b as indicated by arrow E. Likewise, since polarity contact 215 is in electrical communication with contacts 235b and since polarity contact 215 is in electrical communication with battery assembly 28, then the electrical circuit is complete for reverse rotation of drill 10. In this manner, the user may selectively reverse the direction of motor rotation thereby controlling the direction of drill bit rotation to permit the advance or removal of drill bit 49 as appropriate.

Figure 4:
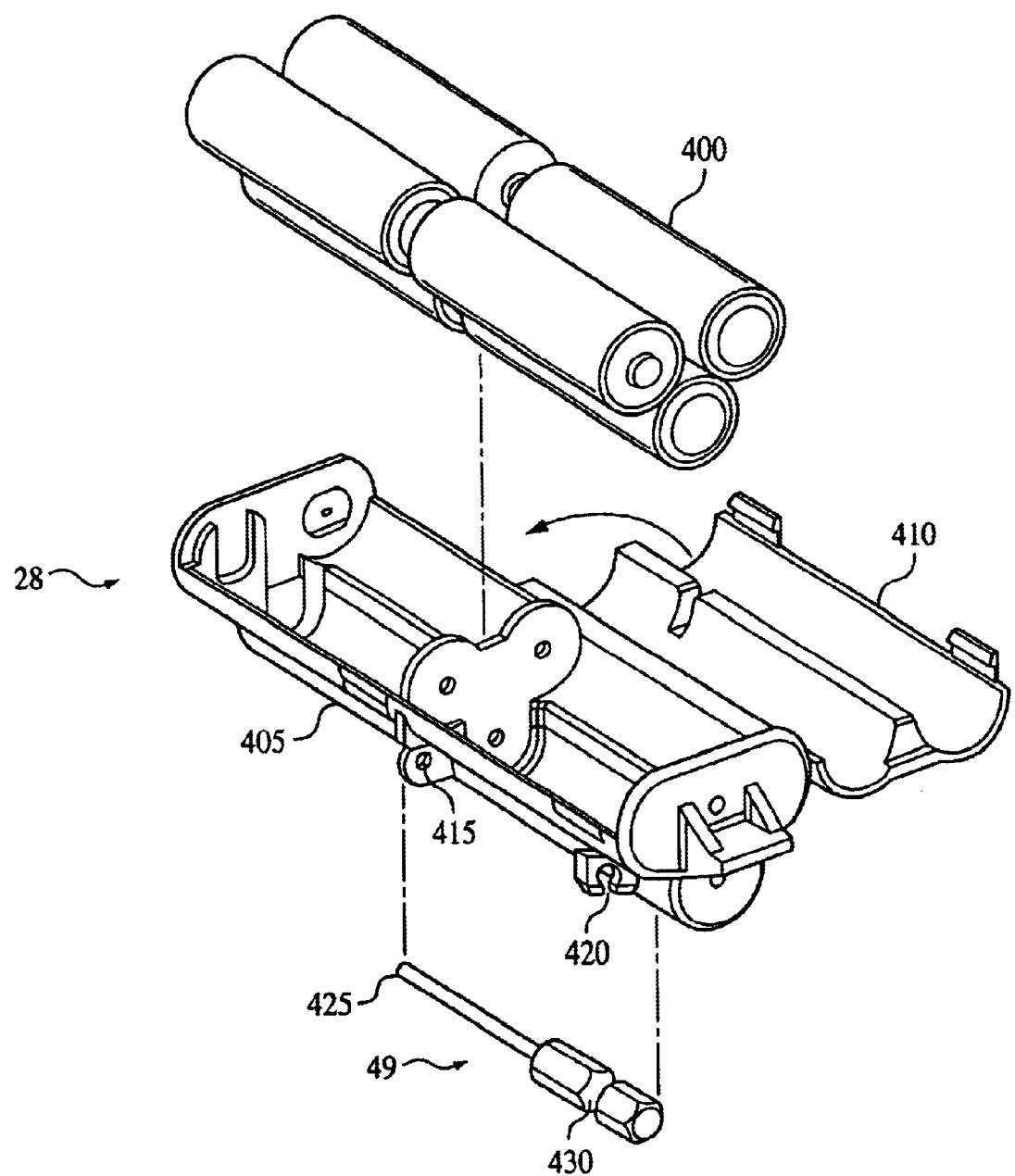
FIG. 4 is a perspective view of battery assembly 28 according to the present invention.

As shown in FIG. 4, battery assembly 28 comprises batteries 400 that are stored in a retainer housing 405 that is removable from tool handle 16 by removing cap 31 and sliding out retainer housing 405. Retainer housing 405 includes a hinged door 410 that is capable of being snapped into place thereby retaining batteries 400. Preferably, retainer housing 405 also includes a hole 415 and slot or groove 420 for storing one or more drill bits 49. To store drill bit 49, preferably the tip 425 of drill bit 49 is first inserted into hole 415 and then the groove 430 in the shank of drill bit 49 is than snapped into the slot 420. Although only one hole and slot is shown in FIG. 4, it is contemplated that two or more sets of holes and slots may be provided on retainer housing 405 to store two or more drill bits. Further, other means known in the art may be provided on retainer housing 405 to store one or more drill bits 49.

Preferably, the source of electrical energy to power drill 10 is battery assembly 28 comprising six alkaline batteries. Although alkaline batteries are preferred, it may be obvious to one skilled in the art that other battery types are within the scope of the present invention. Also, although six alkaline batteries are utilized in the preferred embodiment, it is obvious that at least one battery or more than six batteries may be used. Additionally, the source of electrical energy to power drill 10 may be AC voltage that would also require a motor capable of being powered with AC voltage and a power cord to plug into a standard AC wall receptacle.

Figure 5:
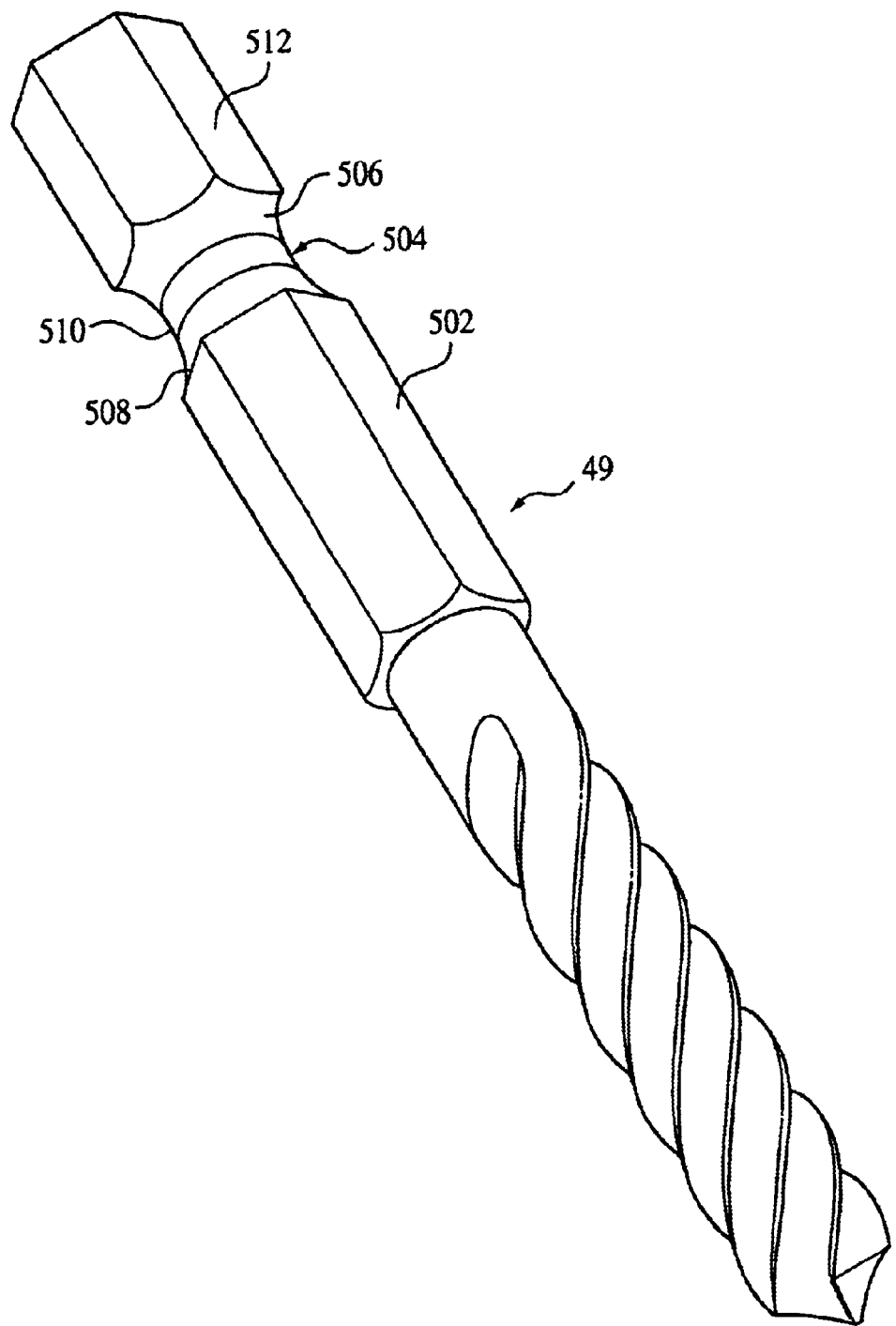
FIG. 5 is a perspective view of drill bit 49.

Although the present invention provides a powered drill 10, it is obvious to one skilled in the art that powered drill 10 may be utilized as a powered screwdriver. Accordingly, instead of utilizing drill bits 49, the user would utilize power bits having various head designs such as phillips, flat head, or other appropriate power bits in common usage. Such drill bits or power bits would include a hexagonal shank and a circumferentially extending groove. As shown in FIG. 5, drill bit 49 includes a hexagonal shank 502 and a radially inwardly extending circumferential groove 504. The groove 504 is of a predetermined width and a predetermined depth. The groove 504 includes a pair of radius portions 506 and 508, and a bottom flat 510 between the radius portions 506 and 508. At the rear end of the drill bit 49 is a rear face 514. Between the groove 504 and the rear face 514 is a rear shank portion 512.

As shown in FIG. 1, motor 30 includes an armature shaft (not shown) that has motor pinion gear 52 mounted thereon. Motor speed is reduced through a series of gear reduction stages. Stage one gear reduction includes gear 55 having a shaft with pinion gear 58 mounted thereon. Gear 55 engages pinion gear 52. Stage two gear reduction includes gear 61 having a shaft 64 with pinion gear 67 mounted thereon wherein gear 61 engages pinion gear 58. Preferably, the gear speed reduction is approximately 24:1.

Drill 10 further comprises a spindle 70 that includes a cylindrical outer surface 73 at one end having a hex-shaped internal bore 76 for receiving drill bit 49 and a gear 79 at the other end that engages pinion gear 67. Drill bit 49 defines an axis of rotation, A'. Intermediate the hex-shaped internal bore 76 and gear 79 is a shaft portion 82. Shaft bushing 85 and shaft bushing 88 encompass the shaft portion 82 of spindle 70 and are provided as a bearing surface. Shaft bushing 85 also includes a bearing for receiving shaft 64.

One important feature of the present invention is a unique quick-release chuck assembly 90 integrated within drill 10 that utilizes a trigger located near power trigger 45 to actuate the quick-release chuck assembly. Typically, in a prior art quick-release chuck assembly, a sleeve capable of being actuated by the user in an axial direction in order to quickly remove a drill bit and replace it with a different bit. In these prior art quick-release chuck assemblies, the user actuates the sleeve with his/her fingers wherein the user slides the sleeve axially under resistance of a spring from a locked position of the sleeve to an unlocked position of the sleeve. Releasing the sleeve allows the sleeve to move back to the locked position under influence of the spring. As used in the claims, the term "quick-release chuck assembly" is intended to include a sleeve that is capable of being actuated in an axial direction in order to quickly remove/insert a drill bit and a finger activated trigger or actuator that is operably connected to the sleeve-thereby causing the sleeve to move axially when the trigger is activated. The position of the trigger or actuator provides for easy activation without leaving go of the handle while the prior art quick-release chuck assemblies require the user to release their grip on the handle in order to activate the sleeve with their fingers. The locked position may be forwardly disposed and the unlocked position may be rearwardly disposed, although some quick-release chuck assemblies work just the opposite (locked and spring biased rearwardly and unlocked forwardly). The claims are intended to cover both arrangements.

Figure 6A:
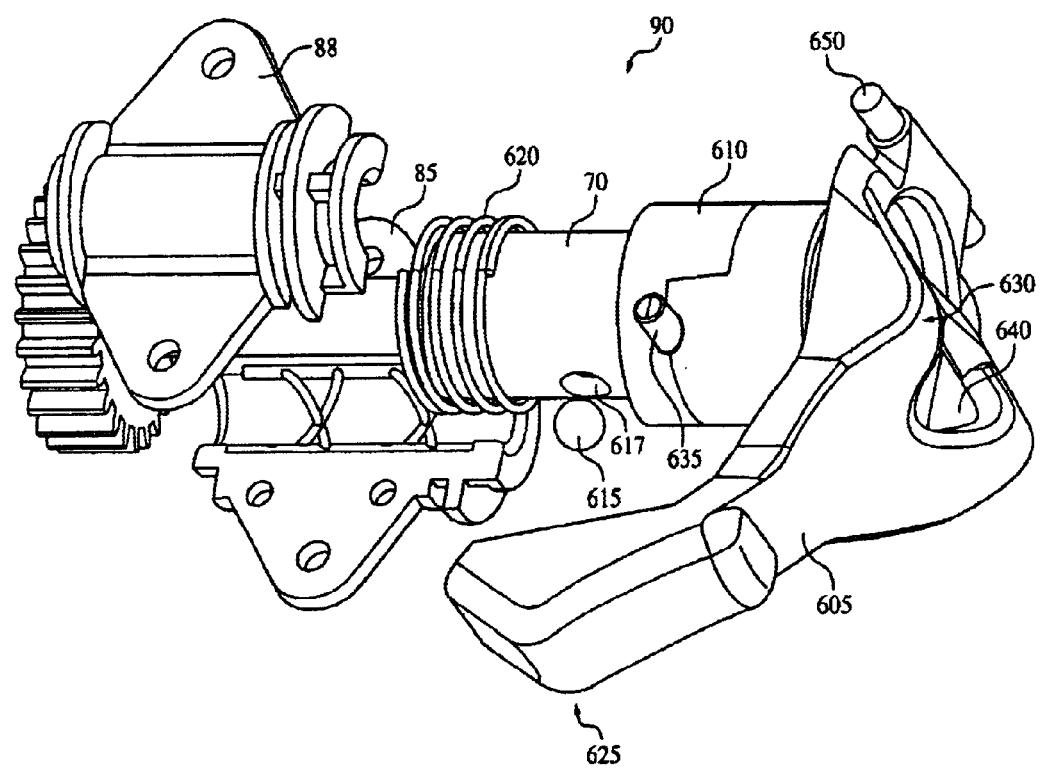
FIG. 6A is an exploded perspective view of quick-release chuck assembly 90 according to the present invention.
Figure 6B:
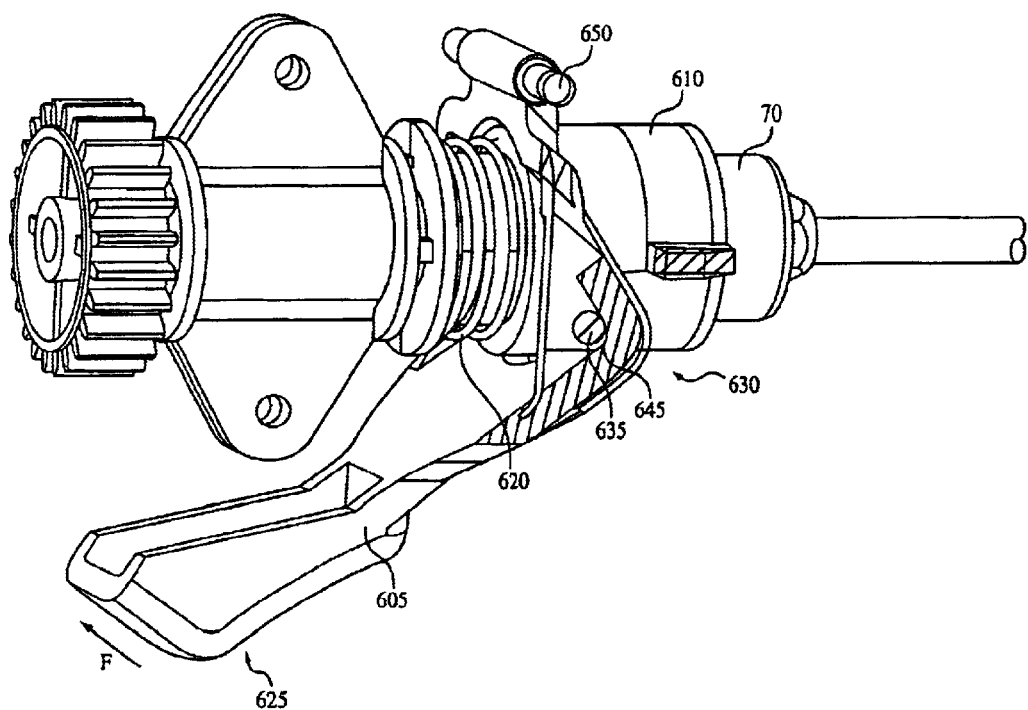
FIG. 6B is an assembled perspective view of quick-release chuck assembly 90 according to the present invention detailing the engagement of ears 635 with the inside surface 645 of trigger 605.

As shown in FIGS. 6A and 6B, the quick-release chuck assembly 90 comprises a release trigger 605, sleeve 610, ball 615 disposed in bore 617 of spindle 70, and spring 620. Preferably, release trigger 605 includes a finger receiving portion 625 that extends from the bottom portion 93 of the motor and gear housing 19 and is within reach of the same index finger used to activate the on-off trigger switch 37 and an actuator portion 630 to cause sleeve 610 to move in an axial direction when finger receiving portion 625 is activated by the user. Sleeve 610 is also situated in the motor and gear housing 19 in a movable relationship with release trigger 605 such that actuation of release trigger 605 causes sleeve 610 to move in an axial direction relative to spindle 70. Sleeve 610 is disposed about spindle 70 and includes an engagement portion such as ears 635 that project outwardly away from sleeve 610. Trigger 605 includes an opening 640 provided in actuator portion 630 of trigger 605 to receive sleeve 610 and is positioned within housing 19 such that an inner surface 645 (i.e., corresponding engagement portion) adjacent opening 640 in trigger 605 is either touching (i.e., in physical communication) or in close proximity with ears 635 on sleeve 610. Accordingly, when trigger 605 is actuated, trigger 605 pivots about pivot point 490 where the pivotal movement of trigger 605 causes sleeve 610 to move in an axial direction relative to spindle 70 when the inner surface 645 of trigger 605 contacts ears 635 on sleeve 610. One skilled in the art would appreciate that the engagement portion of sleeve 610 may take the form of any male-type structure and the corresponding engagement portion of trigger 605 may take the form of any structure that provides for a movable relationship between the two parts (i.e., sleeve 610 and trigger 605) and is within the scope of the present invention. Alternatively, trigger 605 may include the male-type structure where sleeve 610 takes the form of a corresponding engagement portion. Further, one skilled in art would recognize that there are many designs to operably connect sleeve 610 to trigger 605 such that activation of trigger 605 moves sleeve 610 in an axial direction relative to spindle 70 and these designs are within the scope of the present invention By providing release trigger 605 within index finger's reach of the power trigger 45, the user is able to change drill bit 49 with one hand without releasing his/her grip on handle 16 with the other hand. It is also important to note that the quick-release chuck assembly according to the present invention may be provided in any tool that utilizes changeable bits such as a screwdriver, power screwdriver, power drill, power saw, or other power tool. In this context, changeable bits may include power bits, drill bits, or saw blades.

Figure 7A:
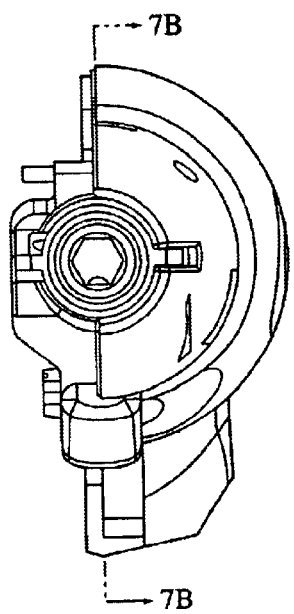
FIG. 7A is a partial front view of powered drill 10 according to the present invention.
Figure 7B:
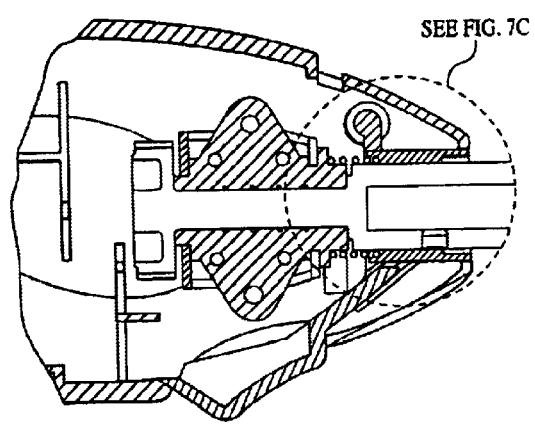
FIG. 7B is a cross-sectional view taken along line Z—Z of FIG. 7A.
Figure 7C:
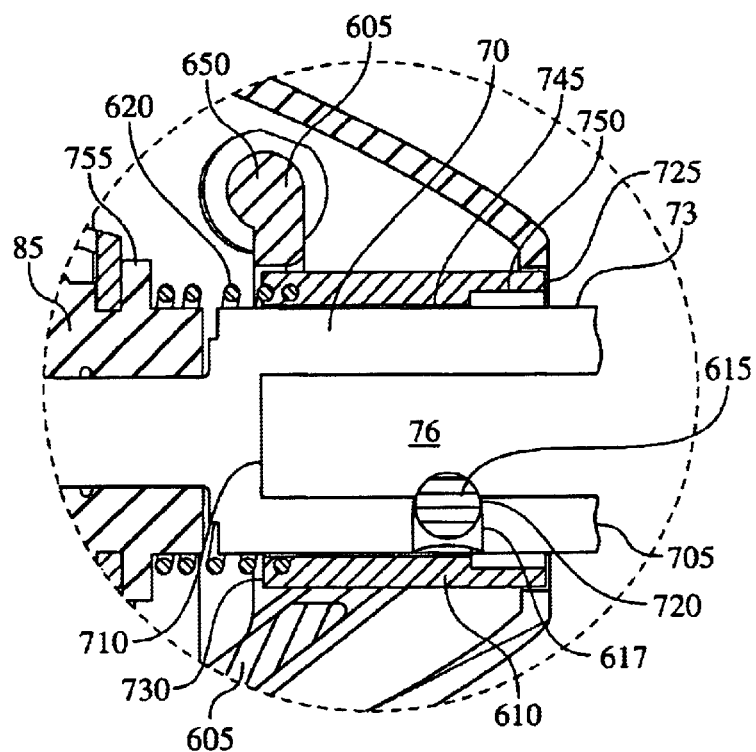
FIG. 7C illustrates Detail X of FIG. 7B showing the internal components of quick-release chuck assembly 90 according to the present invention.

FIG. 7C illustrates the quick-release chuck assembly 90 in detail. As shown in FIG. 7C, spindle 70 includes a front end 705, which defines a front face that is generally perpendicular to the longitudinal axis of the spindle 70. Extending rearwardly from the front end or front face 705 is the internal bore 76. Internal bore 76 is illustrated as being of a hexagonal configuration, but may be of other configurations that prevent rotation of the shank 502 bit 49 in bore 76. Preferably, drill bit 49 includes a hexagonal shank 502 which is adapted to be received into, or to extend into, hexagonal bore 76. The longitudinal axis of bore 76 is substantially aligned with the longitudinal axis of spindle 70. Bore 76 includes a rear end 710 that defines a rear face which is substantially perpendicular to the longitudinal axis of bore 76 and is substantially parallel to the front end or face 705 of spindle 76.

Intermediate the front face 705 and the rear face 710 of spindle 70 is a radially extending bore 617 that extends through cylindrical surface 73 of spindle 70 and communicates with bore 76. At the juncture of bores 76 and 617 is a retainer lip 720 that extends inwardly to decrease the diameter of radial bore 617. Ball 615 is disposed in bore 617 and is retained in bore 617 by retainer lip 720, or is prevented from falling out of bore 617 by retainer lip 720. However, as shown in FIG. 7C, lip 720 allows ball 615 to extend a substantial distance into bore 76. The diameter of ball 615 is slightly less than the diameter of radial bore 617. There is accordingly very little side-to-side movement of ball 615. However, ball 615 moves radially in bore 617, as will be discussed below. Further, one skilled in the art would appreciate that more than one radial bore 617 accepting more than one ball 615 may be provided within spindle 70.

Sleeve 610 includes a front end face 725 that is substantially perpendicular to the longitudinal axis of spindle 70. Parallel to front end face 725 is a rear end face 730. Within sleeve 610 is a rear bore 745 that extends frontwardly from rear face 730 of sleeve 610. The diameter of bore 745 is slightly larger than that of cylindrical surface 73 of spindle 70. Extending frontwardly from rear bore 745 is front bore 750. The diameter of the front bore 750 is greater than that of rear bore 745 to permit a portion of ball 615 to move into the increased space created by bore 750.

The diameter of ball 615 is substantially greater than the thickness of the cylindrical surface 73 of the spindle 70 through which radial bore 617 extends. It follows that the diameter of bore 617 is greater than the overall length of bore 617. Ball 615 accordingly extends partially out of bore 617 and into bore 750 of the sleeve 610, and partially into hexagonal bore 76 of the spindle 70.

A compression spring 620 is provided over the shaft portion 82 of spindle 70 between shaft bushings 85, 88 and rear end face 730 of sleeve 610. Preferably, one end of spring 620 is seated against a rib 75 provided on bushings 85, 88 and the other end of spring 620 is provided against rear end face 730. Spring 620 is disposed about the cylindrical surface 73 of spindle 70 and a portion of shaft bushings 85, 88. Spring 620 biases sleeve 610 frontwardly away from rib 755 provided on bushings 85, 88.

It will be noted that compression spring 620 need not be a very strong spring. A relatively light spring is sufficient to provide the necessary bias between sleeve 610 and spindle 70, and against ball 620, to securely lock drill bit 49 within internal bore 76 of drill 10. The frictional and normal forces applied are sufficient to cause drill bit 49 to be locked or held securely in bore 76. In actuality, the greater the longitudinally outward pull on drill bit 49, the greater are the lockup forces acting through ball 620 between spindle 70 and sleeve 610 against the radius 504 of drill bit shank 502 to secure drill bit 49 within bore 76.

Figure 8A:
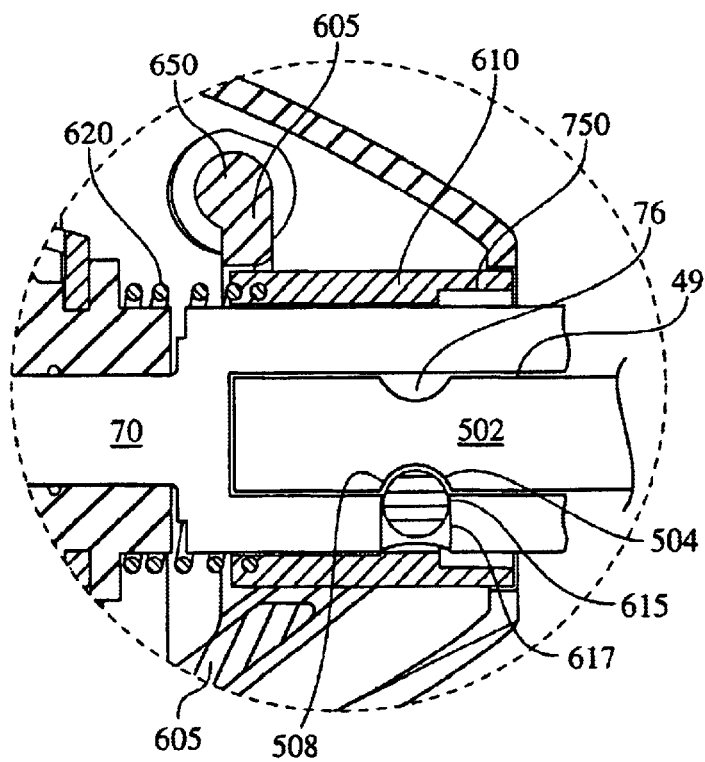
FIG. 8A illustrates the same view as FIG. 7C in the "locked" position to prevent the removal of drill bit 49 from spindle 70.
Figure 8B:
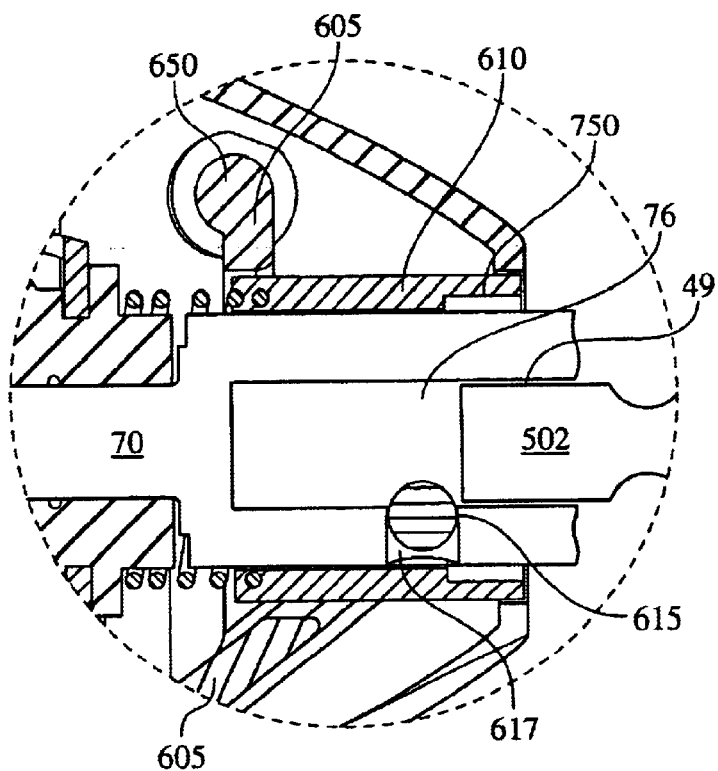
FIG. 8B illustrates the same view as FIG. 7C in the "locked" position to prevent the insertion of drill bit 49 into spindle 70.

Trigger 605 and thus sleeve 610 is movable between a "locked" position where a drill bit 49 cannot be removed or inserted and an "unlocked" position where a drill bit 49 may be inserted or removed. FIGS. 8A–8B illustrate quick-release chuck assembly 90 in the "locked" position. When release trigger 605 is in its normal state (i.e., not being actuated by drill user), drill 10 is in a "locked" position meaning that drill bit 49 cannot be removed if a bit is present or a drill bit 49 cannot be inserted if a drill bit is not present. In a "locked" position as shown in FIG. 8A, spring 620 urges sleeve 610 frontward as shown in FIG. 8A such that ball 615 is situated in bores 76 and 617. Thus, when a drill bit 49 is present in bore 76, ball 615 is forced into groove 504 and against radius 508 of drill bit shank 502 thereby locking drill bit 49 in place. The contact between sleeve 610, ball 615, and drill bit 49 causes both frictional and normal forces to act on drill bit 49 to hold drill bit 49 securely in bore 76 of spindle and to prevent movement of drill bit 49 within bore 76. As shown in FIG. 8B, when a drill bit 49 is not present, ball 615 is situated partially in bore 76 which will prevent a drill bit 49 from being inserted.

Figure 8C:
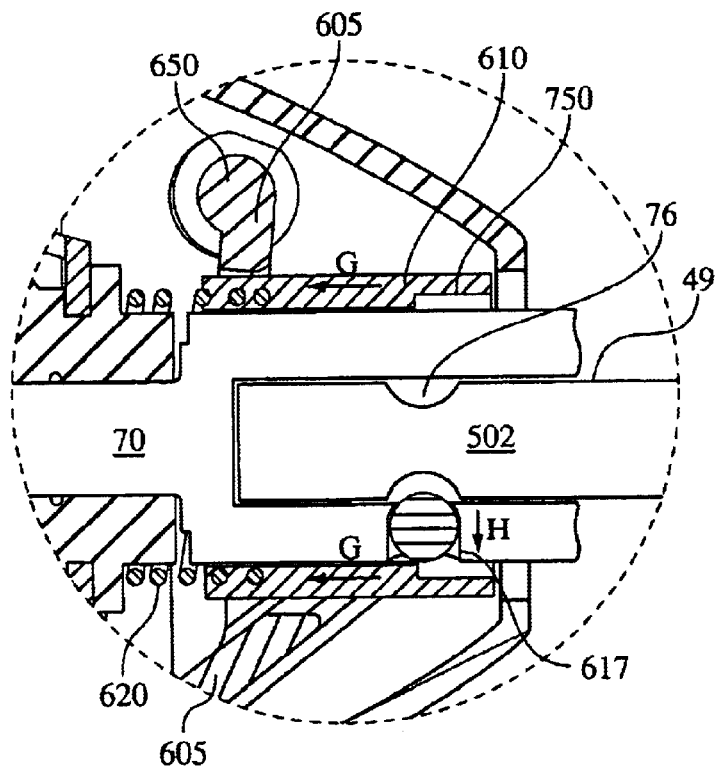
FIG. 8C illustrates the same view as FIG. 7C in a position between the "locked" position and the unlocked position.
Figure 8D:
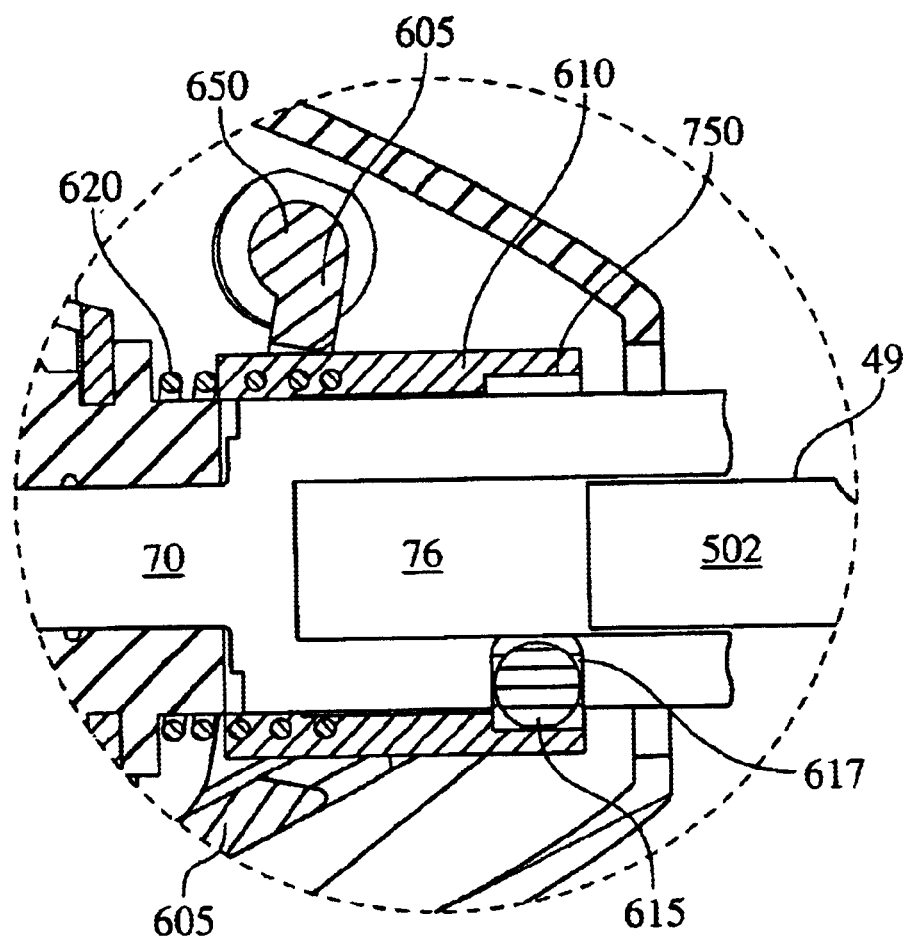
FIG. 8D illustrates the same view as FIG. 7C in the "unlocked" position to permit the insertion of drill bit 49 into spindle 70 or the removal of drill bit 49 into spindle 70.

FIG. 8C illustrates quick-released chuck assembly 90 in the "in-locked" position. When release trigger 605 is actuated by the user, drill 10 is in an "unlocked" position meaning that drill bit 49 can be inserted or removed. In order to insert or remove drill bit 49 from bore 76, release trigger 605 is actuated by the user's finger in the direction as indicated by arrow F in FIG. 6B. Preferably, the finger is the user's index finger that also actuates the on-off trigger switch 37. To operate quick release chuck assembly 90, the user begins to actuate trigger 605 causing trigger 605 to pivot about pivot point 490. As trigger 605 pivots about pivot point 490, the inside surface 645 of trigger 605 forces sleeve 610 (via contact with ears 635) to move in a rearward axial direction indicated by Arrow G against the bias of spring 620 thereby compressing spring 620 such that bore 750 is moving closer to be aligned with bore 617 as shown in FIG. 8C. When bore 750 begins to line up with bore 617, ball 615 begins to drop out of bore 76 and begins to partially drop into bore 750 as indicated by Arrow H. Upon full actuation of trigger 605, ball 615 completely clears bore 76 and rests fully in bores 617 and 750 allowing the user to freely insert a new drill bit 49 or remove an existing drill bit 49 as shown in FIG. 8D. After drill bit 49 is removed from bore 87, sleeve 610 may be returned to its normal state (i.e., locked position) by releasing trigger 605, and ball 615 will move back upwardly into radial bore 617 and partially back into hexagonal bore 76.

Although the invention has been shown and described with respect to certain embodiments, it is obvious that equivalent alterations and modifications will occur to others skilled in the art upon reading and understanding of the specification. The present invention includes all such equivalent alterations and modifications.

What is claimed is:

1. A tool comprising:
   a housing having a handle portion and a distal end portion, said distal end portion includes a spindle capable of receiving a bit and defining an axis of rotation; and
   a quick-release chuck assembly including:
      a sleeve disposed about said spindle and spring biased in a locked position of said sleeve, said sleeve capable of being moved axially to an unlocked position to permit insertion and removal of such bit in said spindle, said sleeve being capable of returning to the locked position of said sleeve, and
      a trigger having a finger receiving portion and an actuator portion, said finger receiving portion extends from said housing in a position enabling the user to actuate said finger receiving portion of said trigger with a finger of the hand holding said handle portion of said housing, said actuator portion of said trigger being in physical communication with an engagement portion of said sleeve wherein the activation of said finger receiving portion of said trigger causes said sleeve to move axially to the unlocked position of said sleeve, said engagement portion of said sleeve comprises at least one ear that extends from an outer surface of said sleeve.

2. The tool of claim 1, wherein said actuator portion of said trigger includes a surface that engages said at least one ear when the user actuates said finger receiving portion of said trigger thereby causing said sleeve to move axially relative to said spindle.

3. The tool of claim 1, wherein said spindle includes a hexagonal bore for receiving a tool bit having a hexagonal tool shank and a groove disposed in said tool shank.

4. The tool of claim 3, wherein said quick-release chuck assembly further includes a ball disposed in a radial bore that is provided in said spindle, said radial bore being in communication with said hexagonal bore, said ball being extendible into said hexagonal bore of said spindle to seat against said groove in said tool bit when said sleeve is actuated to the locked position.

5. The tool of claim 3, wherein said quick-release chuck assembly further includes a plurality of balls and a plurality of radial bores disposed in said spindle wherein each ball is provided in each radial bore, said plurality of radial bores being in communication with said hexagonal bore, each of said plurality of balls being extendible into said hexagonal bore of said spindle to seat against said groove in said tool bit when said sleeve is actuated to the locked position.

6. The tool of claim 1, wherein the sleeve is moved axially away from said distal portion of said housing when the user actuates said finger receiving portion of said trigger.

7. A quick-release chuck assembly for use in a tool having a housing that includes a handle portion and a distal end portion, said distal end portion includes a spindle capable of receiving a bit and defining an axis of rotation, said quick-release chuck assembly comprising:
   a sleeve disposed about said spindle and spring biased in a locked position of said sleeve, said sleeve capable of being moved axially to an unlocked position to permit insertion and removal of such bit in said spindle, said sleeve being capable of returning to the locked position of said sleeve, and
   a trigger having a finger receiving portion and an actuator portion, said finger receiving portion extends from said housing in a position enabling the user to actuate said finger receiving portion of said trigger with a finger of the hand holding said handle portion of said housing, said actuator portion of said trigger being in physical communication with an engagement portion of said sleeve wherein the activation of said finger receiving portion of said trigger causes said sleeve to move axially to the unlocked position of said sleeve, said engagement portion of said sleeve comprises at least one ear that extends from an outer surface of said sleeve.

8. The assembly of claim 7, wherein said actuator portion of said trigger includes a surface that engages said at least one ear when the user actuates said finger receiving portion of said trigger thereby causing said sleeve to move axially relative to said spindle.

9. The assembly of claim 7, wherein said finger is the user's index finger.

10. The assembly of claim 7, wherein said spindle includes a hexagonal bore for receiving a tool bit having a hexagonal tool shank and a groove disposed in said tool shank.

11. The assembly of claim 10, further comprising a ball disposed in a radial bore that is provided in said spindle, said radial bore being in communication with said hexagonal bore, said ball being extendible into said hexagonal bore of said spindle to seat against said groove in said tool bit when said sleeve is actuated to the locked position.

12. The assembly of claim 10, further comprising a plurality of balls and a plurality of radial bores disposed in said spindle wherein each ball is provided in each radial bore, said plurality of radial bores being in communication with said hexagonal bore, each of said plurality of balls being extendible into said hexagonal bore of said spindle to seat against said groove in said tool bit when said sleeve is actuated to the locked position.

13. The assembly of claim 7, wherein the sleeve is moved axially away from said distal portion of said housing when the user actuates said finger receiving portion of said trigger.

14. A tool comprising:
a housing having a handle portion and a distal end portion, said distal end portion includes a spindle capable of receiving a bit and defining an axis of rotation; and
a quick-release chuck assembly including:
a sleeve disposed about said spindle and spring biased in a locked position of said sleeve, said sleeve comprises at least one ear that extends from an outer surface of said sleeve, said sleeve capable of being moved axially to an unlocked position to permit insertion and removal of such bit in said spindle, said sleeve being capable of returning to the locked position of said sleeve, and
a trigger having a finger receiving portion and an actuator portion, said finger receiving portion extends from said housing in a position enabling the user to actuate said finger receiving portion of said trigger with a finger of the hand holding said handle portion of said housing, said actuator portion of said trigger being disposed about said sleeve such that activation of said finger receiving portion of said trigger moves said sleeve axially to the unlocked position of said sleeve.

* * * * *